US007949651B2

(12) United States Patent
Ju et al.

(10) Patent No.: US 7,949,651 B2
(45) Date of Patent: May 24, 2011

(54) DISAMBIGUATING RESIDENTIAL LISTING SEARCH RESULTS

(75) Inventors: Yun-Cheng Ju, Bellevue, WA (US); Ye-Yi Wang, Redmond, WA (US)

(73) Assignee: Microsoft Corporaiton, Redmond, WA (US)

( * ) Notice: Subject to any disclaimer, the term of this patent is extended or adjusted under 35 U.S.C. 154(b) by 491 days.

(21) Appl. No.: 11/774,927

(22) Filed: Jul. 9, 2007

(65) Prior Publication Data

US 2009/0019027 A1     Jan. 15, 2009

(51) Int. Cl.
G06F 7/02 (2006.01)
G06F 17/21 (2006.01)
G06F 15/04 (2006.01)
G10L 13/08 (2006.01)
G10L 11/02 (2006.01)
H04M 11/06 (2006.01)

(52) U.S. Cl. ........ 707/713; 707/722; 707/752; 704/200; 704/270; 704/258; 379/93.15

(58) Field of Classification Search .................. 707/3, 5, 707/999.003, 999.005, 705, 722, 752; 704/270, 704/200, 258; 379/93.15
See application file for complete search history.

(56) References Cited

U.S. PATENT DOCUMENTS

| 5,987,408 | A | 11/1999 | Gupta |
| 6,421,672 | B1 | 7/2002 | McAllister et al. |
| 6,557,004 | B1 | 4/2003 | Ben-Shachar et al. |
| 6,687,696 | B2 | 2/2004 | Hofmann et al. |
| 6,947,539 | B2 | 9/2005 | Graham et al. |
| 7,013,280 | B2 | 3/2006 | Davis et al. |
| 7,096,232 | B2 * | 8/2006 | Doss et al. ................. 707/104.1 |
| 7,146,383 | B2 * | 12/2006 | Martin et al. .............. 707/104.1 |
| 2003/0163319 | A1 | 8/2003 | Kemble et al. |
| 2004/0193403 | A1 | 9/2004 | Creamer et al. |
| 2005/0015366 | A1 | 1/2005 | Carrasco et al. |
| 2007/0061335 | A1 | 3/2007 | Ramer et al. |
| 2008/0243777 | A1 * | 10/2008 | Stewart et al. .................. 707/3 |

FOREIGN PATENT DOCUMENTS

| WO | 2009009312 A2 | 1/2009 |
| WO | 2009009312 A3 | 1/2009 |

OTHER PUBLICATIONS

Levin et al., E., "Voice User Interface Design for Automated Directory Assistance", Interspeech-2005, Sep. 2005, pp. 2509-2512.
Bose, R., "Natural Language Processing: Current state and future directions", International Journal of the Computer, the Internet and Management, vol. 12, No. 1, Jan.-Apr. 2004, pp. 1-11.
"Nuance Voice Search: Directory Assistance", http://www.nuance.com/voicesearch/da.asp, as of May 22, 2007.
Search Report and Written Opinion dated Dec. 18, 2008 for International application No. PCT/US2008/068487.

\* cited by examiner

*Primary Examiner* — James Trujillo
*Assistant Examiner* — Bruce M Moser
(74) *Attorney, Agent, or Firm* — Joseph R. Kelly; Westman, Champlin & Kelly, P.A.

(57) ABSTRACT

A directory assistance system includes a directory database and a search engine. The search engine is configured to search the directory database for a first set of residential listings based on at least one first search term. A second search term is received that is related to a cohabitant of the listing to be found. At least one search result is selected that satisfies the second search term.

17 Claims, 6 Drawing Sheets

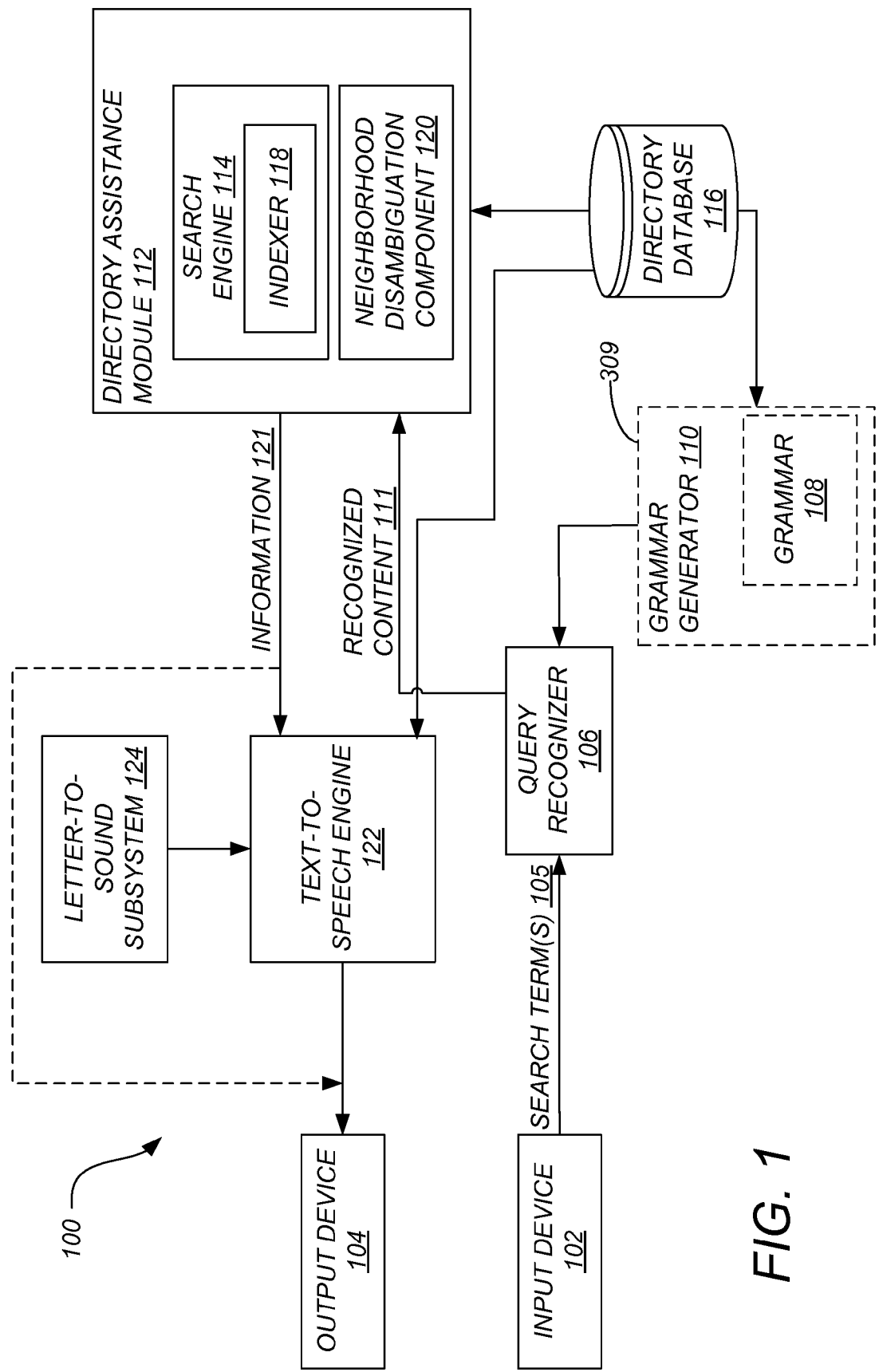

DISAMBIGUATING RESIDENTIAL LISTING SEARCH RESULTS

BACKGROUND

An automated directory assistance (DA) system can be a telephone-based system that provides a caller with a phone number and/or address of a desired business, government or residential listing. The automated DA system can be used to complement or replace the traditional human operated 411 services. An automated DA system can also be a web-based system that provides a user with a phone number and/or address of a desired business, government or residential listing that is rendered on a display.

A typical telephone-based automated DA system includes a speech recognizer and a search engine. The speech recognizer receives a user's utterance and transforms it into text form. The text then serves as the basis for a query that is used by the search engine to find the desired listing in a database of listings. A typical web-based system includes a search engine that takes typed text as the basis for a query to find the desired listing in a database of listings.

One main problem regarding both telephone-based DA systems and web-based DA systems is search result disambiguation. In general, business listing search results can often be disambiguated using street name or neighborhood information. For example, to find a particular coffee shop among all the coffee shop chain entries that a search engine returns, the DA system can disambiguate by requesting location information, such as street name or neighborhood information. In general, a chain of coffee shops are distributed over large areas. Thus, a user can differentiate by a targeted location. However, disambiguating residential search results using street name or neighborhood information may not be sufficient. For example, "Mike Smith" is a common name where multiple people with the same name can live in the same neighborhood, on the same street, next door to each other or even in the same building. Disambiguating residential listings by street name or neighborhood information may be unsuccessful. In addition, oftentimes a user does not know the exact address of a person.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

Described herein is a computer system for searching a directory database such as, but not limited to, a directory assistance (DA) system. The directory database comprises a plurality of listings. Each listing in the directory database includes at least a name, address and phone number. A query recognizer receives a search term from a user. The query recognizer can take numerous forms. For example, the query recognizer can be a speech recognizer, handwriting recognizer or simply a module that takes text in such as through a keyboard and formulates a query.

A search engine receives at least a first search term from the query recognizer that is related to a listing to be found. The search engine searches the directory database to return a first set of listings based on the at least one search term. The search engine receives a second search term related to a cohabitant of the listing to be found. At least one listing is selected that satisfies the second search term.

BRIEF DESCRIPTION OF THE DRAWINGS

FIG. 1 illustrates a block diagram of a directory assistance system under one embodiment.

DETAILED DESCRIPTION

Figure 2A:
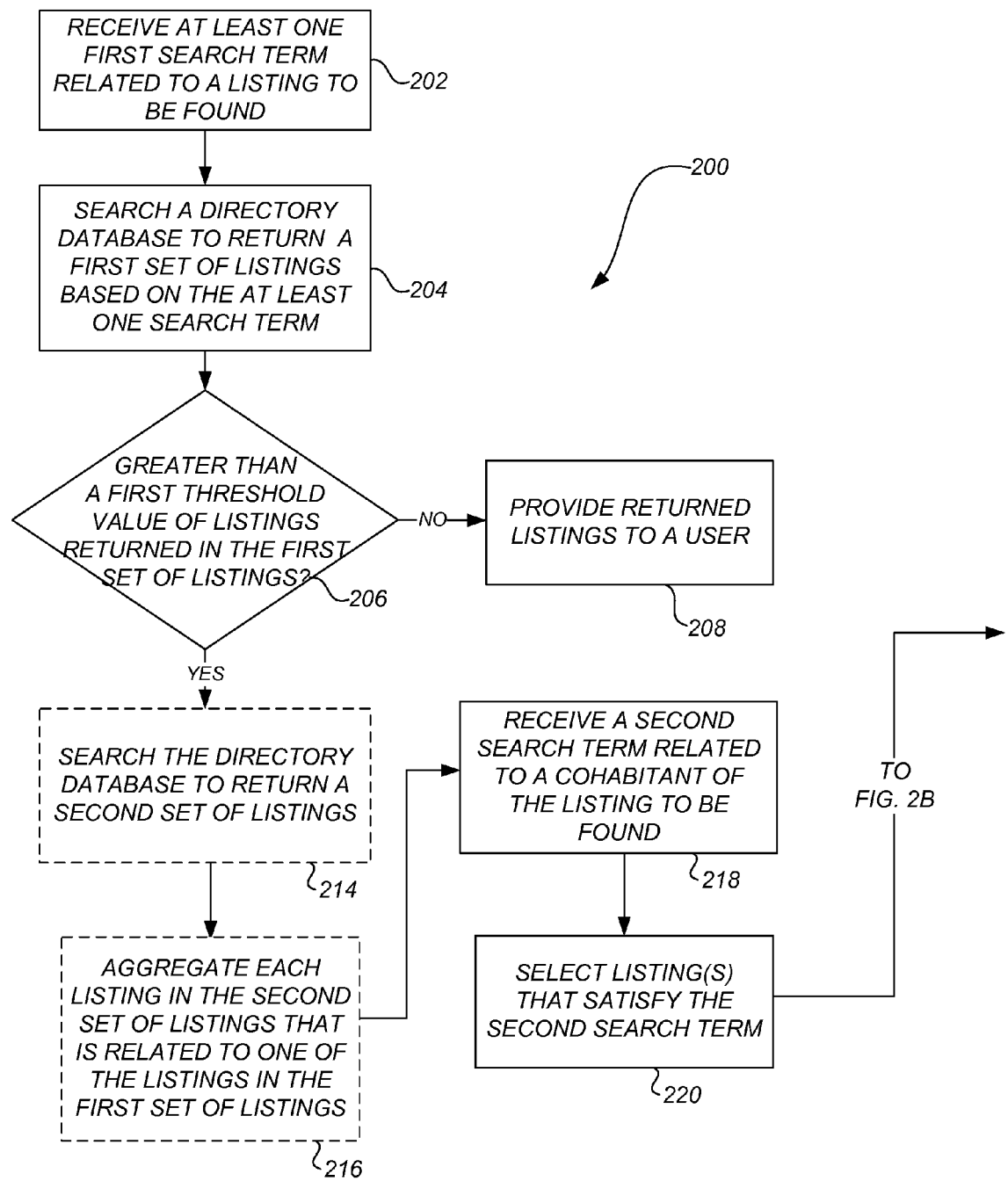
FIGS. 2A and 2B illustrate a flowchart of a method of performing a residential listing directory search under one embodiment.

FIG. 1 is a schematic diagram of a directory assistance (DA) system 100 under one embodiment. DA system 100 includes an input device 102 and an output device 104. At input device 102, DA system 100 receives at least one search term 105. DA system 100 processes the search term 105 to produce a listing, which is returned at output device 104. More specifically, embodiments relate to DA system 100 receiving a search term 105 at input device 102 for finding a residential listing. In one embodiment, search term 105 can be the name of a person and a corresponding listing can be a phone number, an address, an email address or some other identifier or information corresponding to the search term. Oftentimes, input device 102 requires more than one search term. For example, search terms 105 can include the name of a person and the corresponding city and state in which the person lives.

DA system 100 includes a query recognizer 106 configured to process search term(s) 105 by applying a grammar 108 generated by a grammar generator 110 so as to identify the content of search term(s) 105. Aspects herein described are not limited to any particular method of recognition. For example, in one embodiment, but not by limitation, query recognizer 106 is a speech recognition engine configured to apply a speech recognition grammar 108 so as to recognize the content of search term(s) 105, which is an utterance spoken by a user. Such an embodiment can be useful in a telephone-based directory assistance environment where input device 102 is a microphone. In another embodiment, query recognizer 106 is a handwriting recognition engine configured to apply a collection of handwriting characteristics so as to recognize the content of search term(s) 105, which is handwriting input by a user. Such an embodiment can be useful in a web-based directory assistance environment where input device 102 is a handwriting input capture device. In yet another embodiment, query recognizer 106 is a text recognition engine configured to apply a collection of text recognition characteristics so as to recognize the content of search term(s) 105, which is illustratively text input by a user 102. Such an embodiment can be useful in a web-based directory assistance environment where input device 102 can be a keyboard, pointing device or similar device for receiving a textual input.

The recognized content 111 of search term(s) 105 is provided to a directory assistance module 112. Module 112 includes a search engine 114 and a neighborhood disambiguation component 120. Search engine 114 is illustratively configured to compare recognized content 111 against a database of listings 116. In this manner, module 112 identifies, from database 116, one or more listings that match the recognized content 111 of the search term(s) 105. Search engine 114 includes an indexer 118. The indexer 118 allows the search engine to rapidly find listings that match the recognized content 111. Disambiguation component 120 allows directory assistance module 112 to further disambiguate between listings that are returned from database 116.

Information 121 is provided to output device 104 after listings that match the recognized content 111 are returned to module 112. One example information 121 that can be sent to output device 104 include prompts to a user to input further search terms for disambiguation of the returned listings. When module 112 can not determine a listing to output to a user, module 112 requests users for further search terms for purposes of disambiguation. In such an example, the further search terms are received at input device 102 and recognized by query recognizer 106. Examples of further search terms include additional names and addresses related to the returned listings. In another example, a listing or listings that do not need further disambiguation are information 121 that includes the matching listing or listings.

In a telephone-based directory assistance environment, information 121 is first provided to a text-to-speech engine 122 for converting text into spoken output. Text-to-speech engine 122 includes a pronunciation dictionary to determine the pronunciation of a lexical item. Text-to-speech engine 122 resorts to letter-to-sound subsystem 124 when the pronunciation dictionary fails to contain an entry for a lexical item. After transformation from text to speech, the information 121 is provided to output device 104. For example, in this embodiment, output device 104 can be a speaker. In a web-based directory assistance environment, information 121 is directly provided to output device 104 (via the dashed arrow). For example, in this embodiment, output device 104 can be a display.

Figure 2B:
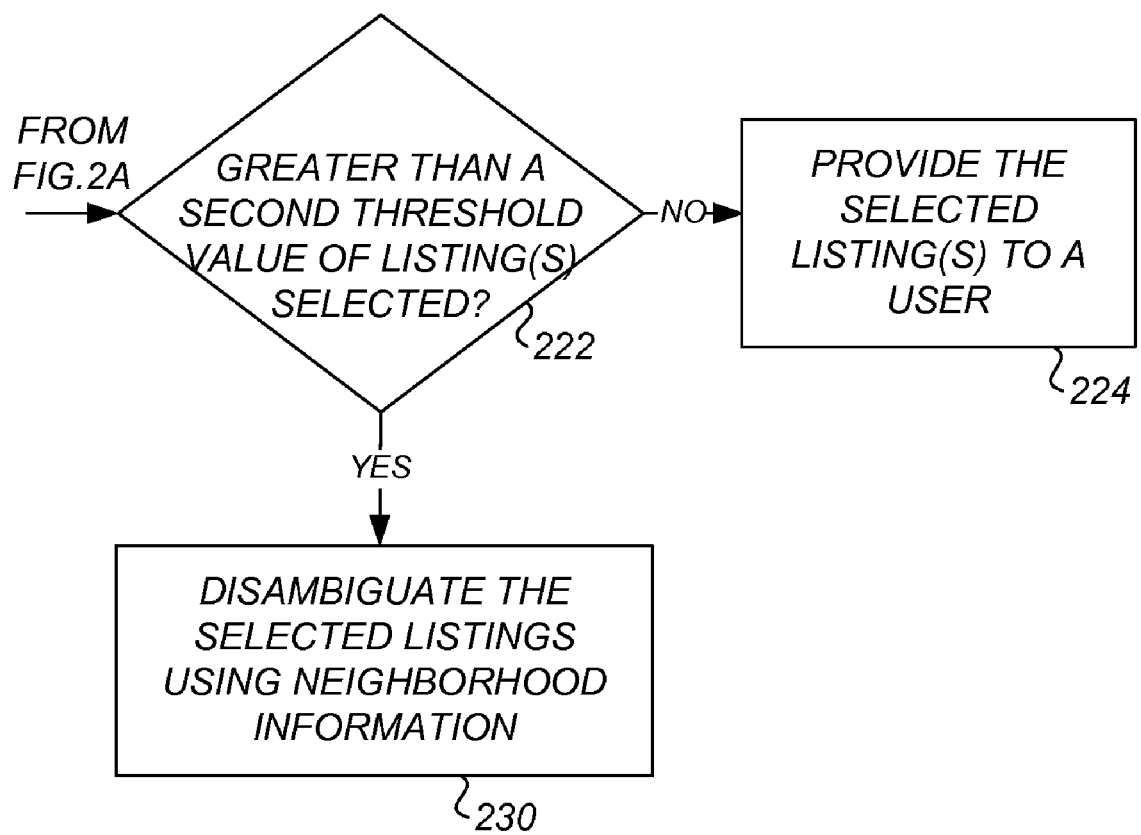

FIGS. 2A and 2B illustrate a flowchart 200 of a method of performing a residential listing directory search under one embodiment. Flowchart 200 is performed in accordance with the elements of DA system 100 illustrated in FIG. 1. At block 202, at least one first search term 105 (FIG. 1) that is related to a listing to be found is received. In general, at least one first search term 105 is received by input device 102. For example, the name "John Smith" can be an at least one first search term 105. It should be understood, however, that DA system 100 (FIG. 1) may need other search terms to perform a query. One such example can be the city and state where John Smith resides, such as Minneapolis, Minn. At this point, the at least one search term is recognized by query recognizer 106 (as discussed above in FIG. 1) and recognized content 111 (FIG. 1) is passed to DA module 112.

Figures 3A, 3B, 3C:
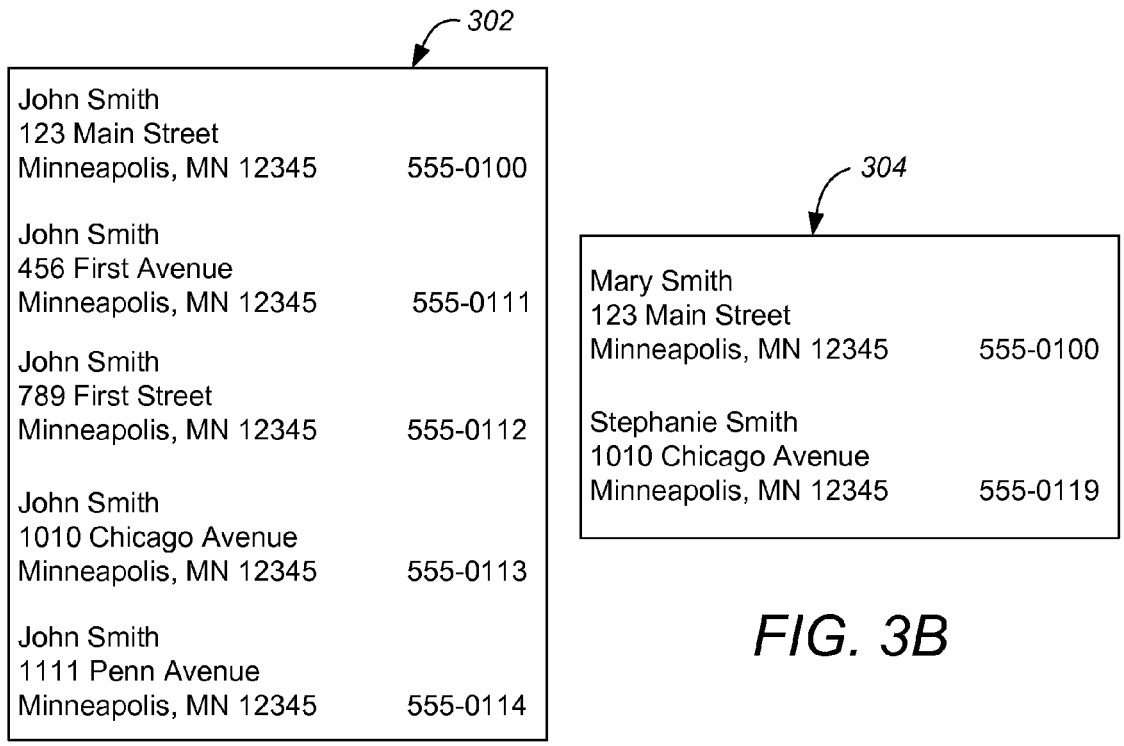
FIGS. 3A-3C illustrate example first and second sets of listings as returned from the directory database illustrated in FIG. 1 under one embodiment.

At block 204, search engine 114 (FIG. 1) searches directory database 116 to return a first set of listings based on the at least one first search term 105. FIG. 3A illustrates an example of a first set of listings 302. Since there is a high likelihood that multiple listings of John Smith will be returned because of the popularity of the name, as illustrated, there are five John Smiths that are located in the city of Minneapolis and the state of Minnesota. At block 206, it is determined whether greater than a first threshold value of listings were returned in the first set of listings. For example, the first threshold value can be three. If greater than three listings were returned (as is the case in the example illustrated in FIG. 3A), then flowchart 200 proceeds to block 214 or in the alternative flowchart 200 can proceed directly to block 218. If three or less listings were returned, then flowchart 200 proceeds instead to block 208. At block 208, the returned listings are provided to a user. It should be noted that three is only an example first threshold value and other values can be considered as a first threshold value. For example, a single listing or two listings are other example first threshold values.

In one embodiment, at block 214, search engine 114 searches directory database 116 based on the first set of listings to return a second set of listings. Each of the second set of listings shares at least a portion of listing information with one of the first set of listings. In one embodiment, indexer 118 (FIG. 1) performs a reverse address or phone number search of directory database 116 (FIG. 1) based on the first set of listings 302 in order to find names of other people that may reside at the same residence as the John Smith to be found. In this embodiment, cohabitant information is determined on the fly during search engine runtime. FIG. 3B illustrates an example of a second set of listings 304. As illustrated, there are two additional listings that list at least a portion of the same information as information in the first set of listings 302. In particular, the two listings (Mary Smith and Stephanie Smith) share the same addresses as two of the listings in the first set of listings 302. At block 216, each listing in the second set of listings is aggregated by indexer 118 (FIG. 1) with one of the related listings in the first set of listings. Such an aggregation is illustrated in FIG. 3C. After aggregation, DA system 100 (FIG. 1) prompts a user to input a name of a cohabitant of the listing to be found. A cohabitant can be any of a family member, housemate, roommate and domestic partner, such as a spouse. At block 218, the cohabitant's name is considered a second search term 105. In general, the second search term 105 is received by input device 102 (FIG. 1).

In an alternative embodiment, flowchart 200 can pass from block 206 directly to block 218. In this embodiment, cohabitation information can be compiled before search engine runtime. In particular, listings stored in directory database 116 (FIG. 1) can include a "reside with" field that include names of people who reside with the listing. In this alternative embodiment, the returned first set of listings would already include cohabitation information.

At block 220, at least one listing is selected that satisfies the second search term 105. In one embodiment, the selected listing(s) are from the aggregated first and second set of listings if search engine obtains cohabitant information by searching the directory database 116 for a second set of listings. In another embodiment, the selected listing(s) are from the first set of listings if directory database 116 already includes aggregated cohabitant information in "reside with" fields. For example, if the second search term was the name Mary, then the directory assistance module 112 would select the John Smith that has the same address or phone number as the name Mary. In this example, only one listing satisfies the search term Mary, so the directory assistance module 112 would select the appropriate John Smith and return it to output device 104. At block 222, it is determined whether greater than a second threshold value of listings were selected. For example, the second threshold value can be three. If greater than three listings were selected, then flowchart 200 proceeds to block 230. If three or less listings were returned (as is the case in the example illustrated in FIG. 3C), then flowchart 200 proceeds instead to block 224. At block 208, the returned listing(s) are provided to a user. It should be noted that three listings is only an example second threshold value and other values can be considered as a second threshold value. For example, a single listing or two listings can be other example second threshold values.

At block 230, if there is more than one listing in the selected listings, component 120 (FIG. 1) can further disambiguate the plural listings by using neighborhood information to determine a correct listing. For example, if there were more than one, two or three Marys that live with more than one of the John Smiths that was returned, then further disambiguation can be performed. In this case, DA system 100 (FIG. 1) can prompt a user for more information concerning the neighborhood of the John Smith to be found. For example, the user could respond by stating that the John Smith to be found lives on the east end, the west end and etc or the user could provide a street name or address. Component 120 takes this information and attempts to select one of the search results.

It should be noted that in other embodiments, directory assistance system 100 can take advantage of a human operator instead of only relying on an automated system. For example, after search engine 114 has returned the first set of listing or the second set of listings, an operator can come into communication with a user. An operator can prompt the user to give information related to cohabitants of the listing to be found such that the returned listings can be narrowed. After an operator has elicited such a response, the operator can connect the user to an automated output of the selected listing or can provide the user directly with the information.

Figure 4:
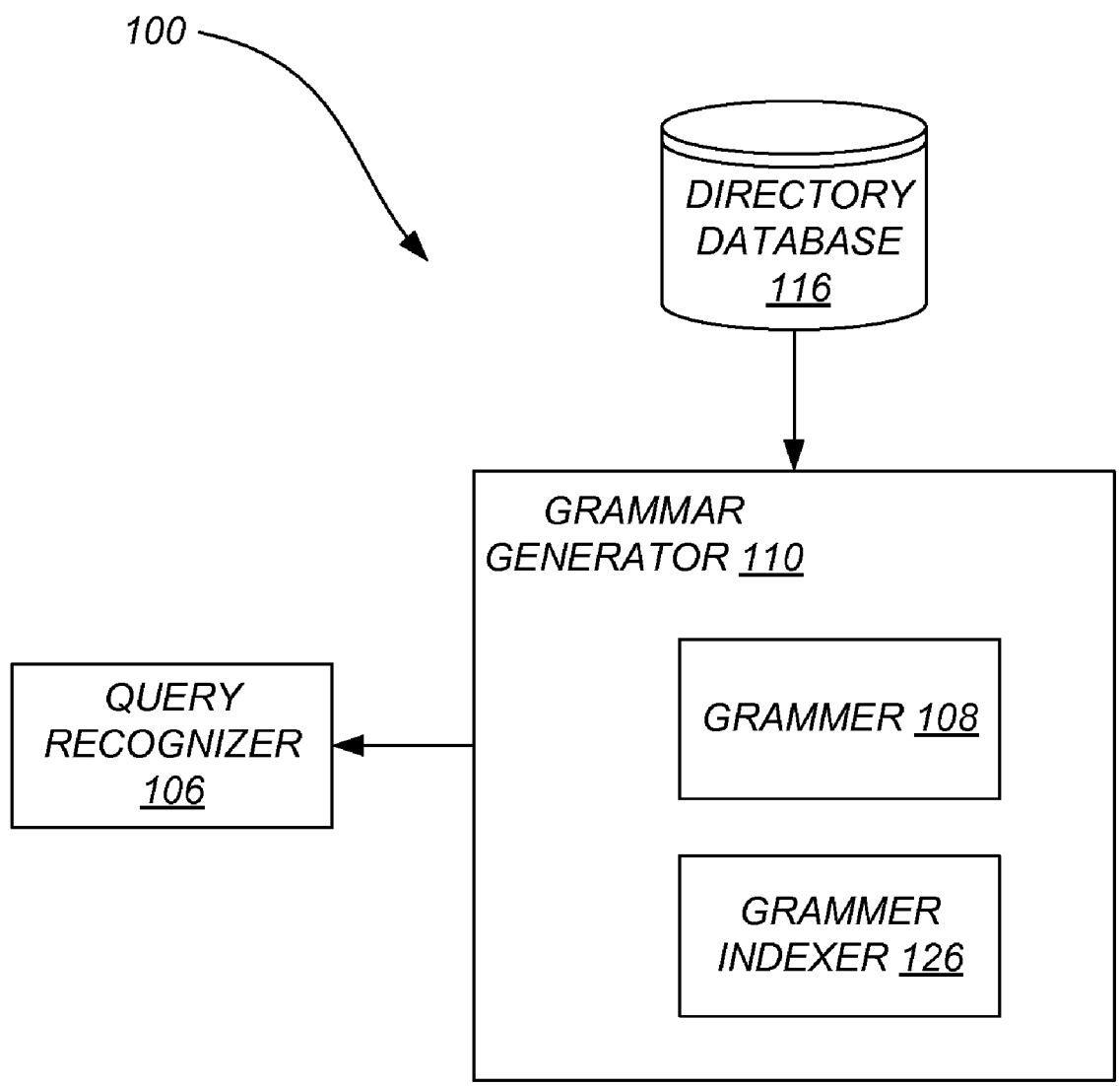
FIG. 4 illustrates the grammar generator illustrated in FIG. 1.

FIG. 4 illustrates a portion of the schematic diagram of DA system 100 illustrated in FIG. 1. In other embodiments and as illustrated in both FIGS. 1 and 4, besides search engine 114 utilizing directory database 116 to search for listings, grammar generator 110 can take advantage of the information stored in directory database 116. Grammar generator 110 can access directory database 116 to generate a grammar 108 that is based on the listings stored in directory database 116. The generated grammar 108 can be used by query recognizer 106 to transform speech into text. In an alternative embodiment, query recognizer can share a pronunciation dictionary with text-to-speech engine 122 (FIG. 1).

In particular, grammar generator 110 includes a grammar indexer 126. In one aspect, grammar indexer 126 is configured to aggregate grammar 108 that includes more than one listing name. For example, John Smith and Mary Smith are domestic partners and are listed together in directory database 116 and therefore in grammar 108 as "John and Mary Smith." Although some users may submit the search term "John and Mary Smith" that is established in grammar 108, oftentimes a user does not provide the name of the listing in a form that is exactly the way it is listed. Therefore, grammar indexer 126 is capable of aggregating different iterations of the listing for use in recognition. Example iterations besides the search term "John and Mary Smith" include "John Smith," "Mary Smith" and "Mary and John Smith." In another aspect, grammar indexer 126 is configured to aggregate grammar 108 that share at least a portion of listing information. For example, John Smith and Mary Smith are domestic partners and are listed separately from each other in directory database 116 and therefore in grammar 108 as "John Smith" and "Mary Smith." Both the "John Smith" listing and the "Mary Smith" listing share at least one of the same address and phone number. Although some users may submit the search term "John Smith" or "Mary Smith" that is established in grammar 108, oftentimes (as discussed above) a user does not provide the name of the listing in a form that is exactly the way it is listed. Therefore, grammar indexer 126 is capable of aggregating different iterations of listings that share at least a portion of listing information. Example iterations besides the search terms "John Smith" and "Mary Smith" includes "John and Mary Smith" and "Mary and John Smith." Grammar indexer 126 can compile grammar from directory database 116 prior to DA system 100 receiving a search term and performing a search for a listing.

Figure 5:
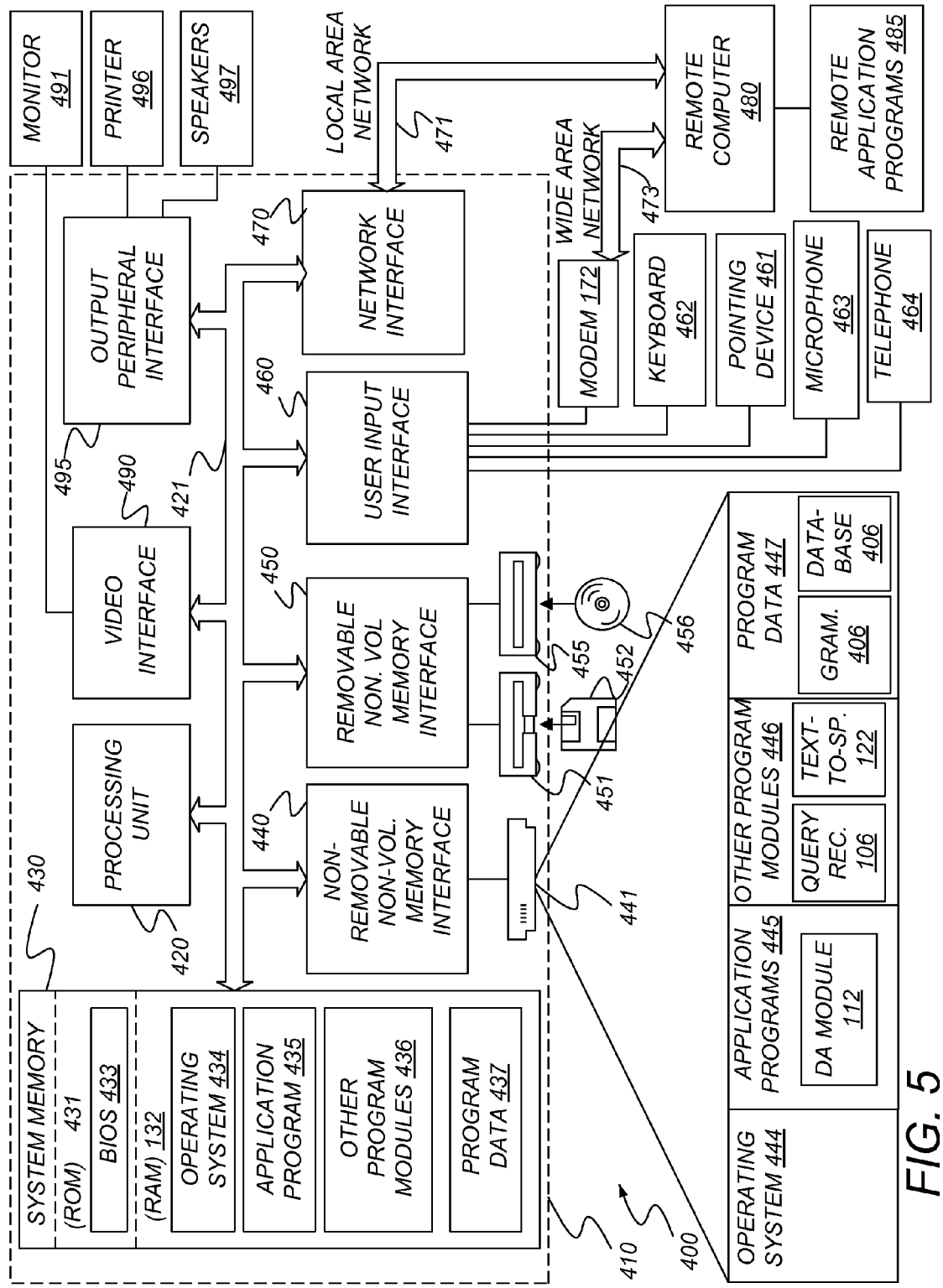
FIG. 5 is a block diagram of one computing environment in which some embodiments may be practiced

FIG. 5 illustrates an example of a suitable computing system environment 400 on which DA embodiments can be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Any of these storage media is capable of providing a data store such as product or service information data store 404. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during startup, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. The drives and their associated storage media are suitable to provide the product or service information data store 104. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. For example, application programs 445 can include directory assistance module 112 (FIG. 1). Other program modules 446 can include query recognizer 106 (FIGS. 1 and 3) and text-to-speech engine 122 (FIGS. 1 and 3). Program data 447 can include grammar generator 110 (FIGS. 1 and 3) and directory database 116 (FIGS. 1 and 3).

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers can also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet. The WAN 473 is of the type which illustratively provides a communication path between the system 100 and the remote device 102.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 521 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of performing a residential listing directory search, the method comprising:
   receiving, by a computer processor, at least one first search term related to a residential listing to be found;
   searching a directory database to return a first set of residential listings using the at least one first search term, each of the first set of residential listings including an address or phone number;
   performing a reverse address or phone number search on the directory database using the addresses or phone numbers of the first set of residential listings to find a second set of residential listings having the same address or phone number as listings in the first set of residential listings;

aggregating listings in the second set of residential listings with listings in the first set of residential listing that share the same address or phone number to form a third set of residential listings of aggregated listings;

receiving a second search term different than the first search term which is a cohabitant name of the residential listing to be found; and selecting at least one of the residential listings from the third set of residential listings using the second search term.

2. The method of claim 1, wherein receiving the at least one first search term comprises receiving an audible first search term and transcribing the audible first search term into text with a speech recognizer.

3. The method of claim 2, wherein transcribing the audible first search term into text with a speech recognizer comprises generating a grammar based on listings in the directory database and aggregating the grammar into a plurality of different listing iterations for use in transcribing the audible first search term into text.

4. The method of claim 1, further comprising providing the at least one listing that is selected that satisfies the second search term as an audible output by using a text-to-speech engine.

5. The method of claim 1, further comprising determining whether greater than a first threshold value of listings were returned in the first set of residential listing prior to receiving the second search term.

6. The method of claim 5, wherein if less than a first threshold value of listings were returned, than provide the returned listings to a user.

7. The method of claim 5, further comprising determining whether greater than a second threshold value of listings were selected that satisfy the second search term.

8. The method of claim 7, wherein if less than the second threshold value of listings were selected, than provide the selected listings to a user.

9. The method of claim 7, wherein if greater than the second threshold value of listings were selected, than disambiguate listings using neighborhood information.

10. The method of claim 1, further comprising determining whether greater than a first threshold value of listings were returned in the first set of residential listings prior to receiving the second search term.

11. The method of claim 10, wherein if less than a first threshold value of listings were returned, than provide the returned listings to a user.

12. The method of claim 10, further comprising determining whether greater than a second threshold value of listings were selected that satisfy the second search term.

13. The method of claim 12, wherein if less than the second threshold value of listings were selected, than provide the selected listings to a user.

14. A directory assistance system comprising:
an input device for receiving at least one first search term related to a residential listing to be found;
a computer readable storage medium comprising a directory database configured to store at least a plurality of residential listings;
a computer processor for:
executing a search engine configured to search the directory database for a first set of residential listings using the at least one first search term, each of the first set of residential listings including an address or phone number;
performing a reverse address or phone number search on the directory database using the addresses or phone numbers of the first set of residential listings to find a second set of residential listings having the same address or phone number as listings in the first set of residential listings;
an indexer aggregating listings in the second set of residential listings with listings in the first set of residential listing that share the same address or phone number to form a third set of residential listings;
a module configured to receive a second search term different than the first search term which is a cohabitant name of the residential listing to be found and to select at least one of the residential listings from the third set of residential listings using the second search term; and
an output device for outputting the at least one selected listing that satisfies the second search term.

15. The directory assistance system of claim 14, further comprising a speech recognizer configured to receive the first search term and the second search term as audible inputs and to transcribe the audible first search term and second search term into text.

16. The directory assistance system of claim 14, further comprising a grammar generator that generates a grammar based on the directory database to help the speech recognizer transcribe the audible first search term and second search term into text, the grammar generator including a grammar indexer capable of aggregating the grammar into a plurality of different listing iterations.

17. The directory assistance system of claim 14, further comprising a text-to-speech engine configured to provide the at least one listing that satisfies the second search term.

* * * * *